(12) United States Patent
Player

(10) Patent No.: US 6,910,127 B1
(45) Date of Patent: Jun. 21, 2005

(54) SYSTEM AND METHOD FOR SECURE NETWORK PROVISIONING BY LOCKING TO PREVENT LOADING OF SUBSEQUENTLY RECEIVED CONFIGURATION DATA

(75) Inventor: Andrew Mark Player, Salem, NH (US)

(73) Assignee: Applied Micro Circuits Corporation, San Diego, CA (US)

( * ) Notice: Subject to any disclaimer, the term of this patent is extended or adjusted under 35 U.S.C. 154(b) by 475 days.

(21) Appl. No.: 10/023,019

(22) Filed: Dec. 18, 2001

(51) Int. Cl.[7] .......................... G06F 15/177
(52) U.S. Cl. .................. 713/1; 713/100; 710/200
(58) Field of Search ............. 713/1, 100; 370/254; 710/200

(56) References Cited

U.S. PATENT DOCUMENTS

| | | | | |
|---|---|---|---|---|
| 4,665,506 A | * | 5/1987 | Cline et al. ............ | 365/189.01 |
| 5,623,670 A | * | 4/1997 | Bohannon et al. ......... | 710/200 |
| 6,029,248 A | * | 2/2000 | Clee et al. ............. | 713/320 |
| 6,308,243 B1 | | 10/2001 | Kido ................... | 711/147 |
| 6,557,101 B1 | * | 4/2003 | MacDonald et al. ...... | 713/100 |

FOREIGN PATENT DOCUMENTS

JP 05265865 A * 10/1993 ......... G06F/12/14

* cited by examiner

Primary Examiner—Thomas Lee
Assistant Examiner—Suresh Suryawanshi
(74) Attorney, Agent, or Firm—Law Office of Gerald Maliszewski; Gerald Maliszewski

(57) ABSTRACT

A system and method have been provided for securely provisioning configuration data in a network-connected integrated circuit device. The method comprises: receiving configuration data addressed to device registers; loading the configuration data in configuration registers; and, locking to prevent the loading of subsequently received configuration data. Locking to prevent the loading of subsequently received configuration data includes the substeps of: establishing at least one locking register having a first address; loading a first lock set in the locking register; and, in response to loading the first lock set in the locking register, preventing the loading of received data in the configuration registers.

28 Claims, 3 Drawing Sheets

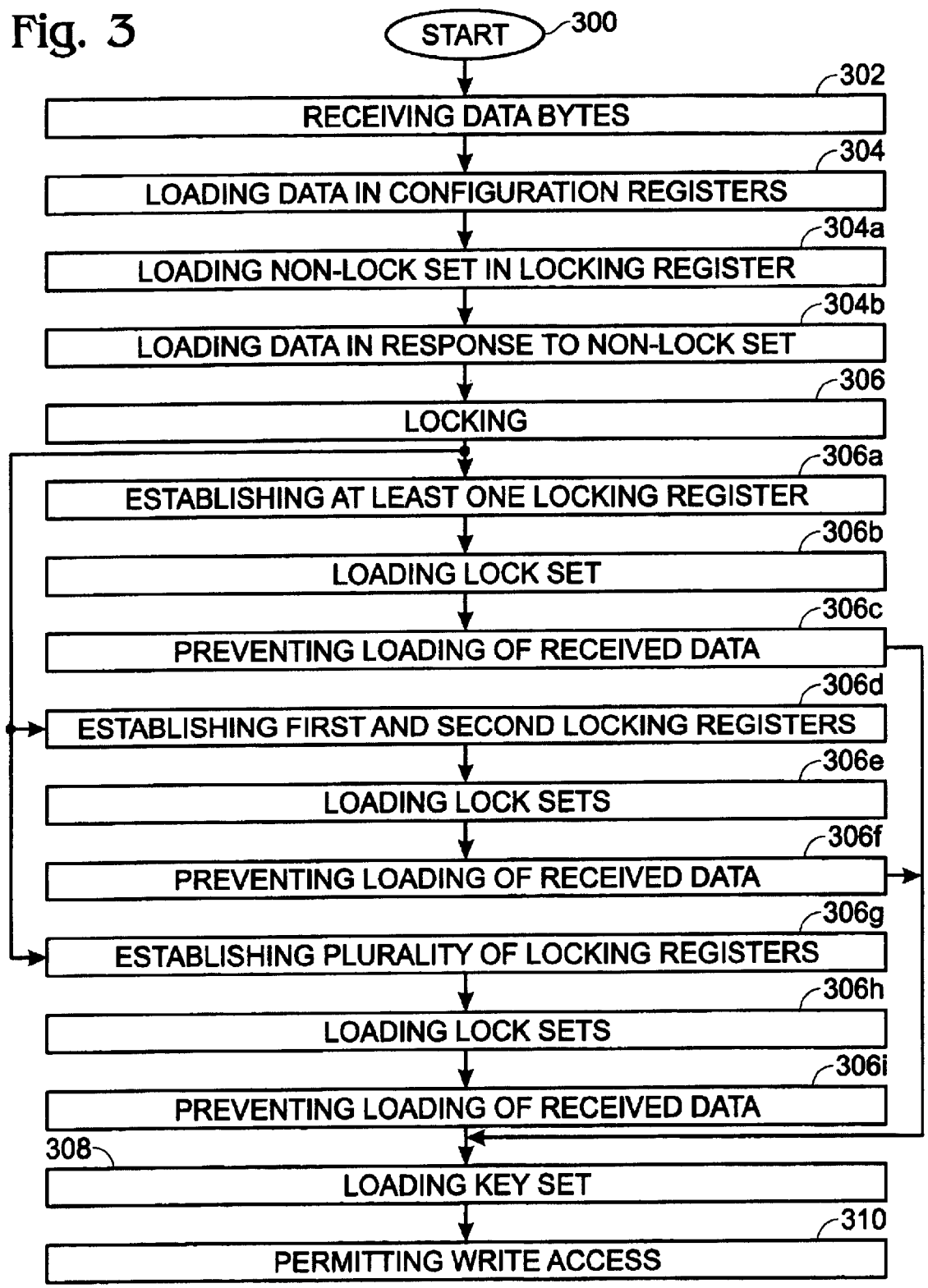

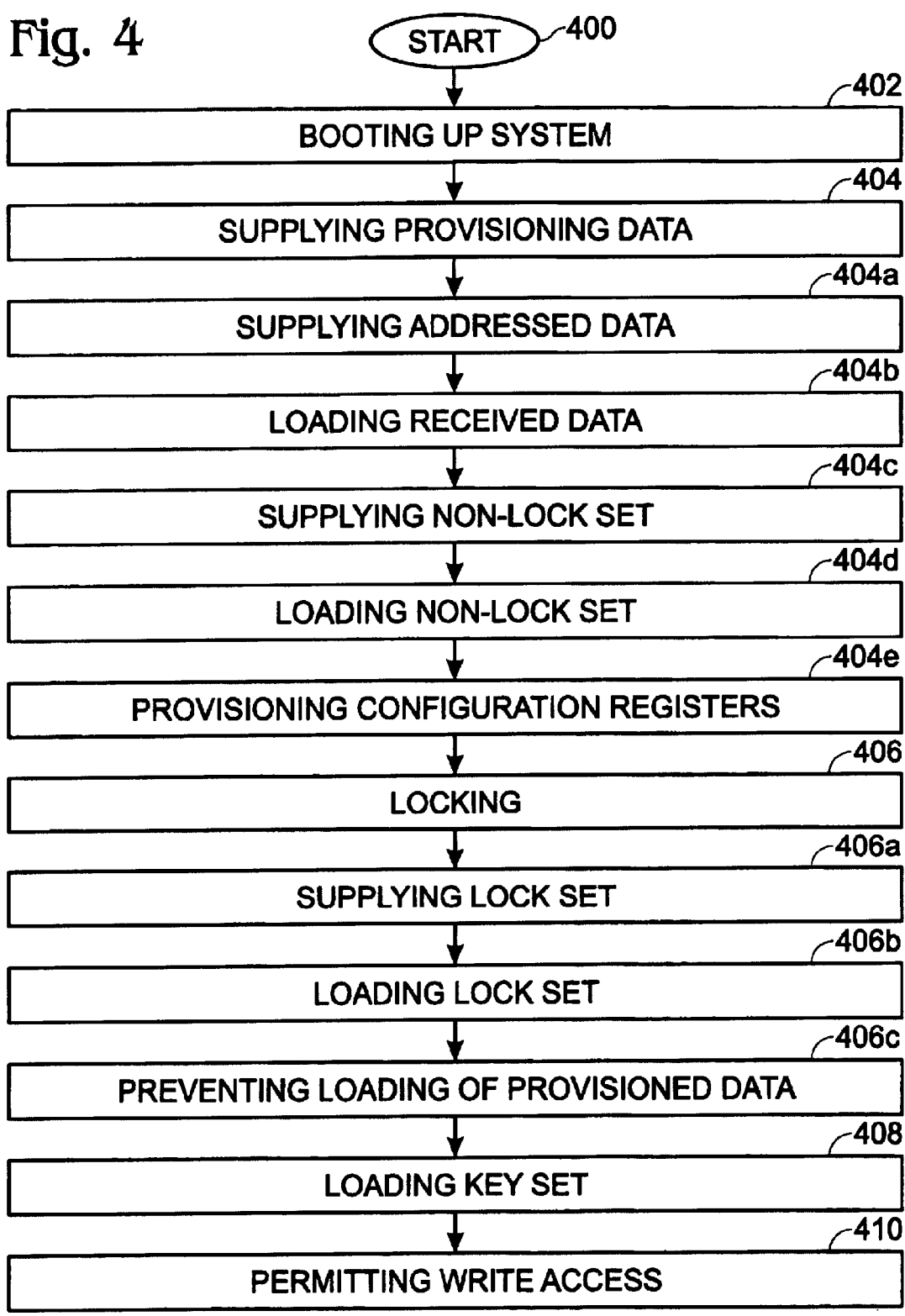

SYSTEM AND METHOD FOR SECURE NETWORK PROVISIONING BY LOCKING TO PREVENT LOADING OF SUBSEQUENTLY RECEIVED CONFIGURATION DATA

BACKGROUND OF THE INVENTION

1. Field of the Invention

This invention generally relates to network communications and, more particularly, to a system and method for securely provisioning network-connected devices with configuration data.

2. Description of the Related Art

As noted in U.S. Pat. No. 6,308,243 (Kido), in a variety of application apparatuses having embedded microcomputers, a real time multitask system is used for processing a number of tasks. In the case where one resource, for example a hard disk drive, is shared for a plurality of tasks, the state of the resource (the contents) can be destroyed by uncontrolled accessing. It is thus necessary for the multitask system to exclusively grant control of the resource access to one task at a time.

A conventional multitask system includes an exclusive control module termed "semaphore " for carrying out the exclusive control. The term, semaphore, is derived from a railroad signaling device with arms. A semaphore, as used in a computer system, remains held in its reset state by an operating system (OS) when the resource is accessed by none of the tasks. When one of the tasks intends to access the resource, it must receive a right of exclusive use from the OS and the semaphore is turned to the set state. While the semaphore for a particular resource is set, the access of the other tasks to the resource is inhibited by the OS.

A different but related problem occurs when a device in the OS, or network of connected-devices inadvertently boots up, perhaps due to a software crash. In these circumstances the device, such as a microprocessor, may transmit inappropriate data on the databus. However, this inappropriate data may be addressed to other devices in the network that are already correctly configured. If one of the network devices reconfigures itself with this inappropriate data, the network could cause damage, become hung up, or require a system-wide reboot. A semaphore is unable to protect the network in the above-mentioned circumstances when the network-connected writing device is not checking for semaphores.

In networks that are built to be compliant to International Telecommunications Union ITU-T G.709 (G.709) standards, there are typically one or more integrated circuits that are built to handle various transport tasks such as performance monitoring, overhead add/drop, messaging, etc. These integrated circuit devices typically have register sets inside them that are used for provisioning the device. These integrated circuits can have many modes of operation, to handle the various configurations and network and data types that are supported. When these integrated circuit devices are built up and deployed in an actual network, they are usually provisioned by a processor only during the boot-up process. After the boot-up process is complete, the processor may access the device from time-to-time, and may even reprogram the device under certain circumstances. However, once provisioned, the network typically has no need to reprogram or rewrite the data in these devices.

Processors use software, and sometimes the software can crash. When the processor enters a crashed state, it may accidentally write data into the provisioning register set of the G.709 integrated circuit (IC), meaning the device gets reprogrammed. This can interrupt the G.709 traffic that would not have been affected by the crashed state of the processor, had the processor not reprogrammed the G.709 device.

It would be advantageous if network-connected devices could be protected from inadvertent reconfiguration.

It would be advantageous if a system existed for securely provisioning a network-connected device with configuration data.

It would be advantageous if a G.709 network could be protected from accidental writing into a provisioning register.

SUMMARY OF THE INVENTION

The present invention provides a lock and key register set in a network-connected device, such as a device in a G.709 network. The invention can use a set of two locking registers at non-contiguous addresses that, when written with a certain lock set, disable a processor from having write access to the network-connected device configuration registers. The non-access exception is for the locking registers themselves. At the end of the processor's normal boot-up routine, it writes the lock set to the locking registers. Then, if the processor enters a crashed state, it will not be able to accidentally rewrite the provisioning registers in the network-connected device. After the processor recovers from the crashed state, it can write a value other than the lock set (a non-lock set) to the two locking registers if it needs to do any reprogramming. The provision of a lock and key to a network-connected integrated circuit is nearly "free " in that only the resources of a few registers and gates are required in a device that typically has hundreds of provisioning registers and thousands or millions of logic gates.

Because processors can sometimes enter a crashed state, it is necessary to ensure that, if they do enter the crashed state, they do not interrupt the normal flow of network traffic. Providing locking registers at non-contiguous addresses in an integrated circuit device is a cost-effective way to make it nearly impossible for a processor that has entered the crashed state to interrupt the normal flow of network traffic by accidentally reprogramming the network-connected integrated circuit devices.

Accordingly, a method is provided for securely provisioning configuration data in a network-connected integrated circuit device. The method comprises: receiving configuration data addressed to device registers; loading the configuration data in configuration registers; and, locking to prevent the loading of subsequently received configuration data. The received data is loaded in configuration registers in response to loading a non-lock set, not equal to the first lock set, in the locking register(s). Locking to prevent the loading of subsequently received configuration data includes the substeps of: establishing at least one locking register having a first address; loading a first lock set in the locking register; and, in response to loading the first lock set in the locking register, preventing the loading of received data in the configuration registers.

In some aspects of the method two locking registers are used. Then, locking to prevent the subsequent loading of configuration data includes: establishing a first locking register having a first address and a second locking register having a second address; loading a first lock set in the first locking register and a second lock set in the second locking register; and, in response to loading the first lock set in the first locking register and the second lock set in the second locking register, preventing the loading of received data in the configuration registers. To prevent inadvertent unlocking, the first address and second address are typically made non-contiguous.

In other aspects of the method, a plurality of locking registers are established. Additional details of the above-mentioned method, and a system for securely provisioning configuration data in a network integrated circuit device are provided below.

BRIEF DESCRIPTION OF THE DRAWINGS

FIG. 3 is a flowchart illustrating the present invention method for securely provisioning configuration data in a network-connected integrated circuit device.

FIG. 4 is a flowchart illustrating the present invention method for securely provisioning configuration data in a system of networked devices.

DETAILED DESCRIPTION OF THE PREFERRED EMBODIMENTS

Figures 1, 2:
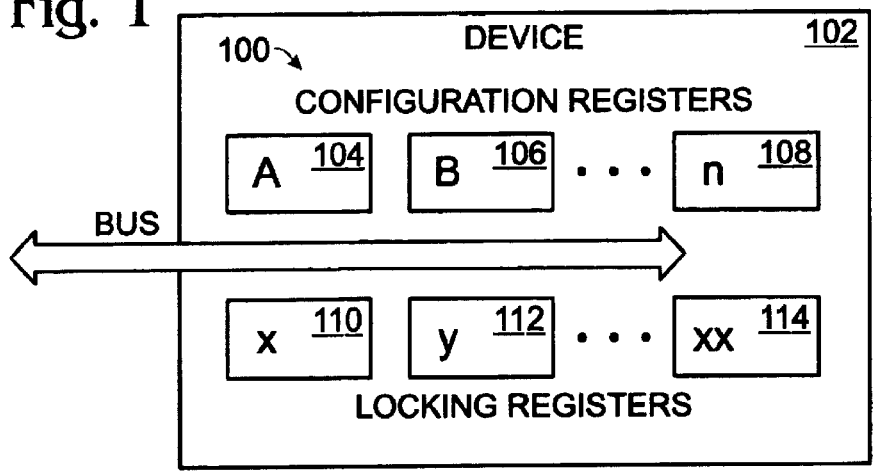
FIG. 1 is a schematic block diagram of the present invention system for securely provisioning configuration data in a network integrated circuit device.
FIG. 2 is a diagram representing the registers of the device of FIG. 1 organized by address.

FIG. 1 is a schematic block diagram of the present invention system 100 for securely provisioning configuration data in a network integrated circuit device 102. The system 100 comprises a plurality of configuration registers having a corresponding plurality of addresses. Shown are configuration register A (104), B (106), and n (108), however, the system 100 is not limited to any particular number of configuration registers. A typical IC device 102 may have thousands of such registers. The device 102 is configured in response to the data in the configuration registers. The system 100 also comprises at least one locking register, having a first address, to prevent the loading of data in the configuration registers 104–108. Shown are locking registers X (110) and Y (112). The register designations A, B, X, Y,. and n may refer to the addresses of the register. Alternately, the labels A, B, X, Y, and n are merely a means of identifying and/or distinguishing these registers.

FIG. 2 is a diagram representing the registers of the device 102 of FIG. 1 organized by address. As shown, register X is loaded with the lock set "01010101". The choice of this value assumes for the purpose of the example that a register contains 1 byte of data. However, it should be understood that the system 100 is not limited to any particular register size. Larger sized locking registers provide greater security as their corresponding lock sets are larger, and therefore, more unique. It is also assumed for the purpose of this example that the value "01010101" is a lock set. When the locking register X is loaded with a lock set, for example first value "01010101", the locking register X prevents the loading of data in the configuration registers.

In other words, if data arrives to the device addressed to registers A, B, and n, it will not be loaded as long as register X contains the lock set. When the locking register X is loaded with a non-lock set not equal to the first lock set, for example the value "00000000", the locking register X permits the loading of data in the configuration registers A, B, and n. As an additional layer of security, the data is only loaded into the configuration registers if a key set is loaded into the locking registers. The key set is a special case of the non-lock set that is a unique, or a limited set of unique values.

For added security, the system typically includes at least two locking registers X and Y. The first locking register X has a first address and the second locking register Y has a second address. Then, the combination of the first (X) and the second (Y) locking registers prevents the loading of data in the configuration registers A, B, and n, in response to loading first and second lock sets, respectively, in the first and second locking registers. As shown, the second lock set in register Y is "01010101".

Improved security is obtained when the first (X) and second (Y) locking registers have non-contiguous first and second addresses. As shown, register X has an address of . . . 001 and register Y has an address of 1000010. The addresses are non-contiguous to prevent the accidental loading of non-lock sets in the registers. That is, it is considered more likely that a software crash will cause to bus write non-lock sets to contiguous registers. Therefore, locking registers are safer from accidental writing when they have very addresses removed (non-adjacent) from each other.

As shown, the first (X) and second (Y) locking registers have first and second lock sets that are equal (01010101). However, the lock sets need not be the same. For example, the lock set for the second locking register (Y) could be (11110000). Further, neither lock set need be limited to any particular lock set. In some aspects of the system, each locking register may respond to more than one lock set. That is, there may be more than one value that acts as a lock set for each locking register.

Returning briefly to FIG. 1, the system 100 can be enabled with more than two locking registers. Some aspects of the system 100 include a plurality of locking registers having a corresponding plurality of addresses. Likewise, the plurality of locking registers has a corresponding plurality of lock sets, which may or may not be the same. In theory, a larger number of locking registers should ensure greater security from accidental configuration. Shown is an additional locking register XX (114), however, the system 100 is not limited to any particular number of locking registers. The plurality of locking registers prevent the loading of data in the configuration registers when a plurality of lock sets are loaded in the corresponding plurality of locking registers.

For additional security all (in this example, three) of the locking registers must be cleared (loaded with non-lock sets) before data can be written into the configuration registers. Thus, data cannot be written into the configuration registers if any one of the locking registers contain a lock set. However, in other aspects of the system 100 can be configured not to block writing to the configuration registers unless all three of the locking registers contain a lock set. That is, the configuration data can be written to, if one or two of the plurality of locking registers contains non-lock sets.

Yet another layer of security can be added to the secure provisioning system 100. In one aspect of the system mentioned above, a non-lock set loaded into the locking register is enough to permit write access to the configuration registers. Typically, the lock set is one unique value, and the non-lock set is any value but the lock set. The added security layer includes a special class of non-lock sets called key sets. Just as there in only one unique value that acts as the lock set, there is only one unique value that acts as the key set. The lock sets are used to lock and key sets are used to unlock.

For example, at least one locking register, say register X, accepts a first key set following the loading the first lock set. The locking register X permits write access to the configuration registers in response to this first key set. For example, the locking register X must be loaded with the specific value "11111111"to clear the register (permit access). In some aspects of the system, more than one value may function as the key set.

In other aspects of the system, the key set is not required for initial configuration, but is required thereafter for any configuration changes (writing). Thus, the network-connected device 102 can be initially configured without addressing the locking registers. The locking registers would likely contain random (non-lock set) values. The configuration registers are locked with a lock set, and no write access to the configuration registers is permitted until the specific non-lock set is loaded into the locking register.

Yet another layer of security can be added to system 100 by requiring a key set for initial configuration. Then, a specific key set, for example "11111111"must be loaded into the locking register before the device 102 can even be initially configured. As above, the key set would have to be loaded into the locking register to permit reconfiguration.

For simplicity and greatest access speed, the system 100 would use a locking register with a combination of a non-lock set and a lock set. Added complexity and security are added with the use of multiple locking registers. Further security is added with the use of a key set (a limited set of non-lock sets) that must be used to clear the lock set from the locking register. The best security is enjoyed when the key sets are also required for initial configuration.

FIG. 3 is a flowchart illustrating the present invention method for securely provisioning configuration data in a network-connected integrated circuit device. Although the method (and the method of FIG. 4 below) is depicted as a sequence of numbered steps for clarity, no order should be inferred from the numbering unless explicitly stated. It should be understood that some of these steps may be skipped, performed in parallel, or performed without the requirement of maintaining a strict order of sequence. The method starts at Step 300. Step 302 receives configuration data. Step 302 receives data bytes addressed to device registers. Step 304 loads the configuration data. Step 304 loads the received data in configuration registers. Step 306 locks to prevent the loading of subsequently received configuration data.

In some aspects of the method, locking to prevent the loading of subsequently received configuration data includes substeps. Step 306a establishes at least one locking register having a first address. Step 306b loads a first lock set in the locking register. Step 306c, in response to loading the first lock set in the locking register, prevents the loading of received data in the configuration registers. For security, the lock set is a unique value, or a limited set of unique values.

In some aspects, loading the received data in configuration registers includes substeps. Step 304a loads a non-lock set, not equal to the first lock set, in the locking register. Step 304b, in response to loading the non-lock set in the locking register, loads received data in the configuration registers. In some aspects, Step 304a loads a key set with a unique value in the locking register. Step 304b, in response to loading the key set in the locking register, loads received data in the configuration registers.

In other aspects of the method, locking to prevent subsequent loading of configuration data includes alternate substeps. Step 306d establishes a first locking register having a first address and a second locking register having a second address. Typically, establishing a first locking register having a first address and a second locking register having a second address in Step 306d includes establishing non-contiguous first and second addresses. Step 306e loads a first lock set in the first locking register and a second lock set in the second locking register. Step 306f, in response to loading the first lock set in the first locking register and the second lock set in the second locking register, prevents the loading of received data in the configuration registers.

In some aspects of the method, establishing a first locking register having a first address and a second locking register having a second address in Step 306d includes the first and second lock set values being equal. Alternately, the first and second lock set values are unequal.

In some aspects, locking to prevent the loading of subsequently received configuration data includes another set of alternate substeps. Step 306g establishes a plurality of locking registers having a corresponding plurality of addresses. Step 306h loads a lock set in each corresponding locking register. Step 306i, in response to loading the plurality of lock sets in the corresponding locking registers, prevents the loading of received data in the configuration registers.

Some aspects of the method include further steps. Step 308, following the loading the first lock set in the locking register, loads a non-lock set in the locking register. Step 310, in response to the non-lock set, permits write access to the configuration registers. In other aspects Step 308 loads a key set with a unique value in the locking register. Step 310, in response to the key set, permits write access to the configuration registers. Alternately stated, once the locking register is loaded with the lock set in Step 306, access to the configuration registers is not permitted until a specific key set is loaded into the locking register. Said yet another way, the non-lock set is required to be equal to the key set. Likewise, initial loading of the configuration registers in Step 304 is not permitted unless the specific key set is first loaded into the locking register. That is, the non-lock set in Step 304a must equal the key set. The key sets in Step 304 and Step 308 are typically the same value, but they need not be so. When multiple locking registers are used, the key sets can have equal values, or different key set values may exist for different locking registers.

FIG. 4 is a flowchart illustrating the present invention method for securely provisioning configuration data in a system of networked devices. The method starts at Step 400. Step 402 boots the system up. Step 404 supplies data to provision at least one network-connected device. Step 406 locks the network-connected device to prevent subsequent data provisioning.

In some aspects of the method, supplying data to provision at least one network-connected device in Step 404 includes substeps. Step 404a supplies data bytes addressed to the device registers. Step 404b loads the received data in the device configuration registers.

In some aspects, locking the network-connected device to prevent subsequent data provisioning in Step 406 includes substeps. Step 406a supplies at least a first lock set. Step 406b loads the first lock set in at least one device locking register having a first address. Step 406c, in response to loading the first lock set in the locking register, prevents the loading of subsequently provisioned data in the device configuration registers. The first lock set is a unique value, or limited set of unique values. For example, different network-connected devices in the system may be issued with different lock and key sets.

In some aspects of the method, supplying data to provision at least one network-connected device in Step 404 includes additional substeps. Step 404c supplies a non-lock set, not equal to the first lock set. Step 404*d* loads the non-lock set in the device locking register. Step 404*e*, in response to loading the non-lock set in the locking register, provisions the device configuration registers. In other aspects, Step 404*c* supplies a key set with a unique value. Step 404*d* loads the key set in the device locking register. Step 404*e*, in response to loading the key set in the locking register, provisions the device configuration registers Some aspects of the method include further steps. Step 408, following the loading the lock set in the locking register, loads a non-lock set (not equal to the lock set) in the locking register. Step 410, in response to the non-lock set, permits write access to the configuration registers. In other aspects, Step 408 loads a key set with a unique value (or limited set of unique values) in the locking register. Step 410, in response to the key set, permits write access to the configuration registers. Alternately stated, once the locking register is loaded with the lock set in Step 406, access to the configuration registers is not permitted until a specific key set is loaded into the locking register.

In some aspects, initial loading of the configuration registers in Step 404 is not permitted unless the specific key set is first loaded into the locking register. That is, the non-lock set in Step 304*c* must equal the key set.

A system and method for securely provisioning a network-connected device have been provided. A few examples have been given as to how the concept of a locking register can be enabled. However, other variations and embodiments of the invention will occur to those skilled in the art.

I claim:

1. In a network-connected integrated circuit device, a method for securely provisioning configuration data, the method comprising:
  receiving configuration data bytes addressed to device registers;
  loading the received configuration data in configuration registers; and,
  locking to prevent the loading of subsequently received configuration data as follows:
    establishing at least one locking register having a first address;
    loading a first lock set in the locking register; and,
    in response to loading the first lock set in the locking register, preventing the loading of received data in the configuration registers.

2. The method of claim 1 wherein loading a first lock set in the locking register includes loading a first lock set having a unique value.

3. The method of claim 2 wherein loading the received data in configuration registers includes:
  loading a non-lock set, not equal to the first lock set, in the locking register; and,
  in response to loading the non-lock set in the locking register, loading received data in the configuration registers.

4. The method of claim 3 wherein loading a non-lock set, not equal to the first lock set, in the locking register includes loading a key set having a unique value; and,
  wherein loading received data in the configuration registers in response to loading the non-lock set in the locking register includes loading received data in response to the key set.

5. The method of claim 3 wherein locking to prevent subsequent loading of configuration data includes:
  establishing a first locking register having a first address and a second locking register having a second address;
  loading a first lock set in the first locking register and a second lock set in the second locking register; and,
  in response to loading the first lock set in the first locking register and the second lock set in the second locking register, preventing the loading of received data in the configuration registers.

6. The method of claim 5 wherein establishing a first locking register having a first address and a second locking register having a second address includes establishing non-contiguous first and second addresses.

7. The method of claim 6 wherein establishing a first locking register having a first address and a second locking register having a second address includes the first and second lock sets having values that are equal.

8. The method of claim 6 wherein establishing a first locking register having a first address and a second locking register having a second address includes the first and second lock sets having values that are unequal.

9. The method of claim 5 wherein locking to prevent the loading of subsequently received configuration data includes:
  establishing a plurality of locking registers having a corresponding plurality of addresses;
  loading a lock set in each corresponding locking register; and,
  in response to loading the plurality of lock sets in the corresponding locking registers, preventing the loading of received data in the configuration registers.

10. The method of claim 3 further comprising:
  following the loading the first lock set in the locking register, loading a non-lock set in the locking register; and,
  in response to the non-lock set, permitting write access to the configuration registers.

11. The method of claim 10 wherein loading a non-lock set in the locking register includes the non-lock set being a key set having a unique value.

12. In a system of networked devices, a method for securely provisioning configuration data, the method comprising:
  booting the system up;
  supplying data to provision at least one network-connected device as follows:
    supplying data bytes addressed to the device registers; and,
    loading the received data in the device configuration registers; and,
  locking the network-connected device to prevent subsequent data provisioning as follows:
    supplying at least a first lock set;
    loading the first lock set in at least one locking register having a first address; and,
    in response to loading the first lock set in the locking register, preventing the loading of subsequently provisioned data in the device configuration registers.

13. The method of claim 12 wherein loading a first lock set in at least one locking register having a first address includes loading a first lock set having a unique value.

14. The method of claim 13 wherein supplying data to provision at least one network-connected device includes:
  supplying a non-lock set, not equal to the first lock set;
  loading the non-lock set in the device locking register; and,
  in response to loading the non-lock set in the locking register, provisioning the device configuration registers.

15. The method of claim 14 wherein supplying a non-lock set, not equal to the first lock set includes supplying a key set having a unique value.

16. The method of claim 14 further comprising:
following the loading the first lock set in the locking register, loading a non-lock set value in the locking register; and,
in response to the non-lock set, permitting write access to the configuration registers.

17. The method of claim 16 wherein the non-lock set is a key set having a unique value.

18. In a network integrated circuit device, a system for securely provisioning configuration data, the system comprising:
a plurality of configuration registers having a corresponding plurality of addresses, wherein the device is configured in response to the data in the configuration registers; and,
at least one locking register, having a first address, to prevent the loading of data in the configuration registers in response to being loaded with a first lock set.

19. The system of claim 18 wherein the first lock set has a unique value.

20. The system of claim 19 wherein the locking register is loaded with a non-lock set not equal to the first lock set, and wherein the locking register permits the loading of data in the configuration registers in response to the non-lock set.

21. The system of claim 20 wherein the locking register is loaded with a key set having a unique value, and wherein the locking register permits the loading of data in the configuration registers in response to the key set.

22. The system of claim 20 wherein the at least one locking register includes a first locking register having a first address and a second locking register having a second address, and wherein the first and second locking registers prevent the loading of data in the configuration registers in response to loading first and second lock sets, respectively, in the first and second locking registers.

23. The system of claim 22 wherein the first and second locking registers have non-contiguous first and second addresses.

24. The system of claim 22 wherein the first and second lock sets have values that are equal.

25. The system of claim 22 wherein the first and second lock sets have values that are not equal.

26. The system of claim 20 further comprising:
a plurality of locking registers having a corresponding plurality of addresses, and wherein the plurality of locking registers prevent the loading of data in the configuration registers in response to loading a plurality of lock sets in the corresponding plurality of locking registers.

27. The system of claim 20 wherein the at least one locking register accepts a non-lock set, following the loading the first lock set, and permits write access to the configuration registers in response to the non-lock set.

28. The system of claim 27 wherein the non-lock set is key set with a unique value.

* * * * *